(12) United States Patent
Resch et al.

(10) Patent No.: US 11,565,611 B2
(45) Date of Patent: Jan. 31, 2023

(54) CHILD SEAT SYSTEM

(71) Applicant: CYBEX GmbH, Bayreuth (DE)

(72) Inventors: Manfred Resch, Bayreuth (DE); Stefan Aschinger, Bayreuth (DE); Franz Peleska, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 0 days.

(21) Appl. No.: 16/647,401

(22) PCT Filed: Sep. 13, 2018

(86) PCT No.: PCT/EP2018/074695
§ 371 (c)(1),
(2) Date: Mar. 13, 2020

(87) PCT Pub. No.: WO2019/053102
PCT Pub. Date: Mar. 21, 2019

(65) Prior Publication Data
US 2020/0215941 A1 Jul. 9, 2020

(30) Foreign Application Priority Data
Sep. 14, 2017 (DE) ............... 20 2017 105 584.1

(51) Int. Cl.
*B60N 2/28* (2006.01)
(52) U.S. Cl.
CPC ......... *B60N 2/2827* (2013.01); *B60N 2/2869* (2013.01); *B60N 2/2875* (2013.01); *B60N 2/2887* (2013.01)

(58) Field of Classification Search
CPC .. B60N 2/2821; B60N 2/2869; B60N 2/2875; B60N 2/2887; B60N 2/2806
(Continued)

(56) References Cited

U.S. PATENT DOCUMENTS

| 4,762,364 A | 8/1988 | Young |
| 4,936,629 A | 6/1990 | Young |

(Continued)

FOREIGN PATENT DOCUMENTS

| CN | 1187433 A | 7/1998 |
| CN | 1382602 A | 12/2002 |

(Continued)

OTHER PUBLICATIONS

"International Application No. PCT/EP2018/074695, International Preliminary Report on Patentability dated Mar. 26, 2020", 10 pgs.

(Continued)

*Primary Examiner* — Sarah B McPartlin
(74) *Attorney, Agent, or Firm* — Schwegman Lundberg & Woessner, P.A.

(57) ABSTRACT

The invention relates to a child seat system, comprising at least one first seat element and a base which can be attached to a vehicle seat, the base having a plinth element and a rotary element. At least the rotary element has at least one fastening device for fastening the first seat element. The rotary element is arranged rotatably on the plinth element in such a way that the rotary element together with the seat element is rotatable relative to the plinth element for changing an orientation of the seat element, the seat element being removable from the base.

11 Claims, 15 Drawing Sheets

(58) Field of Classification Search
USPC .................................................... 297/256.1
See application file for complete search history.

(56) References Cited

U.S. PATENT DOCUMENTS

| | | | | |
|---|---|---|---|---|
| 6,169,629 | B1* | 1/2001 | Otsubo | H04N 13/225 359/462 |
| 7,073,859 | B1 | 7/2006 | Wilson | |
| 2005/0253431 | A1 | 11/2005 | Hei et al. | |
| 2005/0264064 | A1* | 12/2005 | Hei | B60N 2/2848 297/250.1 |
| 2008/0224516 | A1* | 9/2008 | Vegt | B60N 2/2887 297/256.16 |
| 2014/0265489 | A1* | 9/2014 | Morgenstern | B60N 2/2851 297/256.15 |
| 2015/0336481 | A1 | 11/2015 | Horsfall | |

FOREIGN PATENT DOCUMENTS

| | | |
|---|---|---|
| CN | 203472593 U | 3/2014 |
| CN | 104540709 A | 4/2015 |
| DE | 202015104788 | 11/2015 |
| DE | 202016104181 | 8/2016 |
| EP | 2295287 A1 | 3/2011 |
| FR | 2974547 A1 | 11/2012 |
| JP | H05-1579 U | 1/1993 |
| JP | H051579 U | 1/1993 |
| WO | WO-2005069985 A2 | 8/2005 |
| WO | WO-2019053102 A1 | 3/2019 |

OTHER PUBLICATIONS

"International Application No. PCT/EP2018/074695, International Search Report and Written Opinion dated Jan. 15, 2019", (Jan. 15, 2019), 14 pgs.

"European Application Serial No. 18769662.0, Third Party Observation mailed Feb. 26, 2021", 7 pgs.

"Chinese Application No. 201880070514.0, Notification of the First Office Action dated Dec. 10, 2021", (Dec. 10, 2021), 10 pgs.

"European Application No. 3681757, Third Party Observation for application No. EP20180769662 submitted Jan. 22, 2021", (Jan. 22, 2021), 4 pgs.

"Russian Application No. 2020112390/11, Office Action dated Apr. 6, 2022", (Apr. 6, 2022), 8.

"Chinese Application No. 201880070514.0, Second Office Action dated Aug. 8, 2022", (Aug. 8, 2022), 29 pgs.

* cited by examiner

CHILD SEAT SYSTEM

PRIORITY CLAIM TO RELATED APPLICATIONS

This application is a U.S. national stage filing under 35 U.S.C. § 371 from International Application No. PCT/EP2018/074695, filed on 13 Sep. 2018, and published as WO2019/053102 on 21 Mar. 2019, which claims the benefit under 35 U.S.C. 119 to German Application No. 20 2017 105 584.1, filed on 14 Sep. 2017, the benefit of priority of each of which is claimed herein, and which applications and publication are hereby incorporated herein by reference in their entirety.

The invention relates to a child seat system, comprising a seat element and a base which can be attached to an automobile seat.

A child seat system, in which a seat element can be rotated with respect to a base, such that different orientations (in particular a forwards orientation or backwards orientation) can be set, is known from DE 20 2016 104 181 U1. The child seat system in accordance with this prior art is regarded as needing improvement in terms of its flexibility.

It is therefore the object of the invention to propose a child seat system which is comparatively flexible in its application and in particular enables a modification of the orientation of a seat element in the most reliable and secure way possible.

This object is achieved in accordance with a first aspect in particular by virtue of a child seat system, comprising at least one first seat element and one base, which can be attached to a vehicle seat, wherein the base has a plinth element and a rotary element. At least the rotary element preferably has at least one fastening device for fastening the seat element. The rotary element is preferably rotatably arranged (or able to be arranged) on the plinth element in such a manner that the rotary element (alone and/or together with the seat element) can be rotated with respect to the plinth element (about an angle of rotation) in order to change an orientation of the seat element.

In accordance with a second independent aspect, which in particular may be combined with the first aspect, a child seat system is proposed, which has at least one (in particular the upper) first seat element and one (in particular the upper) base, which can be attached to a vehicle seat, wherein the first seat element, in a state mounted on the base, can be rotated with respect to the base or one (in particular the upper) plinth element of the base from a first orientation into a second orientation, which deviates from the first orientation, wherein the seat element can be removed from the base (in particular from the upper rotary element of the base).

A central idea of the first aspect consists in designing the base in two parts (having a plinth element and a rotary element), such that a modification of the orientation of the child seat can be achieved by a corresponding rotation within the base. The seat element may, in this case, remain stationary with respect to the rotary element.

A general central idea of the second aspect consists in the seat element being able to be rotated not just with respect to the base (and specifically in its mounted state), but also being able to be removed (fully) from the base. A corresponding fastening device for fastening the first seat element can preferably be released in this case, such that the seat element can be removed from the rotary element and thus from the base.

The abovementioned measures improve in particular the flexibility of the child seat system in a simple and secure manner.

The rotary element may be a rotary plate. The plinth element may be an element that surrounds the rotary element at the edges. The plinth element can in particular form a recess, in which the rotary element is (rotatably) accommodated, or a frame, in which the rotary element is (rotatably) accommodated.

"Orientation" is to be understood in the present context as the orientation of the seat element in relation to the vehicle direction or the line of sight of the child. In a forwards orientation, the child looks forwards, in the vehicle direction. In a backwards orientation, the child looks backwards, in the direction of the seat back (of a vehicle seat, on which the base is mounted). An axis for a modification of the orientation is in particular, at least substantially, perpendicular.

The seat element can preferably be rotated from a first orientation into a second orientation. This means in particular that the seat element remains in principle on the base or the plinth element (thus at least comes into contact with the base or the plinth element in this case) when the orientation is changed. A rotation of this type is in particular enabled without simultaneous translatory movement (of the seat element relative to the base or the plinth element). Removal of the seat from the base or the plinth element for performing the rotation is not (absolutely) necessary.

In particular, an intermediate position can be adopted between the first and second orientation by means of twisting (or rotation). An angular region can therefore possibly be continuously passed through. In addition to a change in orientation (i.e. a rotation about an at least substantially vertical axis), an inclination of the seat element can possibly be adjusted (which likewise in a certain sense corresponds to a rotation, but the term "inclination" or "change in inclination" will subsequently be used for this movement). An axis for the change in orientation is not identical to an axis for the inclination (or also tilt). The axis for the change in orientation is in particular (at least substantially) perpendicular. The axis for the inclination (i.e. tilt) is an at least substantially horizontal axis (in the mounting position of the seat element). The inclination therefore relates to an inclined position or tilt of the seat, for example converting the seat element from a resting position (lying position) into a sitting position (or also vice versa).

According to a third independent aspect of the invention (which, however, can in particular be combined with the abovementioned first and/or second aspect), a child seat system is proposed, comprising at least one first seat element, one second seat element and one base (which can be attached to a vehicle seat), wherein at least the first seat element (in particular in a state mounted on the base) can be rotated with respect to the base or a (in particular the upper) plinth element of the base from a first orientation into a second orientation, which deviates from the first orientation, wherein a corresponding rotation of the second seat element (i.e. a rotation with respect to the base or one/the plinth element of the base from a first orientation into a second orientation, which deviates from the first orientation, in particular in a state mounted on the base) with respect to the base is prevented or at least restricted compared to the rotation of the first seat element.

The child seat system in accordance with the third aspect improves the flexibility for the user of the child seat system, without neglecting safety aspects at the same time. In particular, restricting the rotation of the second seat element can prevent the latter from being adopted in an undesirable manner (for example in the forwards orientation in the case of a seat element for a comparatively small child or baby).

Preventing the rotation of the second seat element should be understood as meaning that this seat element can only be mounted in one (single) orientation on the base.

Restricting the rotation (in comparison to the first seat element) should be understood as meaning that although the second seat element can be mounted in various orientations on the base (for example in the backwards orientation and in an orientation at least approximately at a 90° angle thereto), it cannot be mounted in all orientations, which are possible for the first seat element (wherein the first seat element can then, for example, be configured in the backwards orientation and forwards orientation and possibly an orientation somewhat perpendicular thereto). In a concrete embodiment, the first seat element can therefore, for example, be mounted both in the forwards and in the backwards orientation, but the second seat element at least not in the forwards orientation.

According to a fourth aspect of the invention (which in particular can be combined with the first and/or second and/or third aspect), a child seat system is proposed, comprising at least one first seat element, one second seat element and one base, which can be attached to a vehicle seat, wherein the first and/or the second seat element (in particular in a state mounted on the base) can be adjusted with respect to the base or one (in particular the upper) plinth element of the base, preferably can be rotated from a first orientation into a second orientation, which deviates from the first orientation. According to a first sub-aspect of the fourth aspect, a manual operating device is provided for a locking device for releasing and/or locking the setting, in particular the rotation, wherein the manual operating device is available if the second seat element is mounted on the base, but is not available or at least only available with difficulty, if the first seat element is mounted on the base.

According to the first sub-aspect of the fourth aspect, a flexible child seat system is achieved, without in particular safety aspects being neglected either. In particular, purely as a result of the configuration of the base, on the one hand, and of the first and second seat element, on the other hand, the manual operating device is either accessible or not. An improvement in safety inherent to the system can thus be achieved, wherein the child seat system is nevertheless comparatively flexible (owing to the plurality of seat elements which can be arranged on the base).

According to a second sub-aspect of the fourth aspect, which can preferably be combined with the first sub-aspect, one (in particular the upper) locking device for releasing and/or locking the setting, in particular rotation is proposed, wherein the locking device can be operated by the first seat element (in particular by changing an inclination of the first seat element), but not by the second seat element (in particular not by changing an inclination of the second seat element), which potentially cannot be modified regarding its inclination. In particular, an "inclination" should be understood in this context as an inclination with respect to the base.

In the context of the fourth aspect, a "setting" of the first or second seat element should in particular be understood as a change of its configuration with respect to the base (i.e. in particular an orientation, possibly also an adjustment of a headrest and/or seat back).

The second sub-aspect of the fourth aspect also makes it possible in particular to provide a flexible system that meets high safety requirements.

Overall, the abovementioned aspects (i.e. the first to fourth aspect) in particular propose a child seat system, in which a base for accommodating a seat element is suitable for enabling the release of the seat element from the base. Furthermore (in particular according to the third and fourth aspect), a base is provided, which is designed for accommodating (not at the same time) two or a plurality of different seat elements, wherein the base is in particular suitable for enabling the release of the respectively accommodated seat. A base is further suggested, on which at least one and possibly a plurality of seat elements, which can be accommodated by the base, can be rotated.

A plinth element should in particular be understood as the part of the base (or the parts or portions) that is in contact with the vehicle seat in the mounted state of the base (on the vehicle seat). In contrast, the rotary element is preferably (in the mounted state of the base) not in contact with the vehicle seat (a contact does not, however, at least not completely, have to be excluded). In the mounted state, the (respective) seat element is preferably in contact with the rotary element. In addition, the (respective) seat element can, however, also (partially) rest on the plinth element.

A removable (detachable) seat element with respect to the base should be understood as a seat element, which can be completely removed from the base such that there is a gap between the seat element and base (after removal).

The rotary element can make up at least 10 weight % of the overall base. Alternatively, or in addition, the plinth element can make up at least 10 weight % relative to the total base. The rotary element can extend over at least 50% of the width of the overall base and/or over at least 30% of the length. The plinth element can extend over at least 90% of the width or the total width of the base element (or define the total width) and/or over at least 90% of the length, preferably define the total length (i.e. the length of the base element). A width should be understood in particular as an extension in a horizontal direction, perpendicular to the orientation of the base or line of vision of the child. A length should be understood as an extension in a horizontal direction, parallel to a line of vision of the child or orientation of the base. In principle, width can be understood as the maximum width, and length as the maximum length.

The rotary element can be designed as a (round, in particular circular) rotary plate or rotary disc.

The child seat system can comprise at least two different seat elements, in particular the first upper seat element and the second upper seat element, which can be respectively mounted by themselves on the base (and can in particular be removed from the base). The seat elements differ from one another in particular in terms of a permitted maximum size and/or the minimum size of the child to be seated. The maximum and/or minimum size of the second seat element is preferably 1.2 times, preferably 1.5 times as big as the maximum or minimum size of the second seat element. Maximum and minimum sizes are stipulated according to UN ECE Reg. 129 (in the version at the time of application or earliest priority date of the present application) for every child seat (or every seat element).

A baby seat or a child seat of group 0/0+ (weight <13 kg; for use during the journey in particular only in the opposite direction from the direction of travel) and/or class I (weight 9 to 18 kg) may be present as one of the seat elements, in particular as the second seat element. A child seat of class I (9 to 18 kg) and/or II (weight 15 to 25 kg) and/or class III (weight 22 to 36 kg) may be provided as a further, in particular first, seat element. The weights refer here to the weight of the child. The link "and/or" in relation to the classes means that the child seats involved can be assigned either only to the one class or only to the other class or both classes, (for example in the case of size-adjustable child seats). The classes should be determined in particular in accordance with the regulation ECE-R 44; 6.1.3 or a comparable regulation (in the version at the time of application or earliest priority date of the present application).

In general, the second seat element is preferably configured for smaller children (in particular babies) than the first seat element. This can, for example, be seen in the fact that the second seat element has a lower height (maximum height), i.e. extension in the vertical direction, than the first seat element (and/or a lower weight). By way of example, a height of the first seat element can be 1.5 times as high as a height of the second child seat element. Furthermore, a weight of the first seat element can amount to at least 1.5 times the weight of the second seat element.

The base, in particular the plinth element, can comprise at least one anchoring device, via which the base (the plinth element) can be anchored (rigidly) to the body of the vehicle. ISOFIX relates to the Standard ISO 13216 (validity at the time of application or earliest priority date of the present application). The anchoring device can comprise at least one or at least (or exactly) two anchoring arms. They can be adjusted in their length, if necessary. The anchoring device may be designed as an ISOFIX anchoring device. Furthermore, the anchoring device can be designed as a latch system anchoring device. Latch systems (wherein latch stands for "lower anchors and tether for children") are common in particular in the USA. The seat element can in particular be connected to retainers by means of (tensioned) belt straps (Soft-ISOFIX).

The base, in particular the plinth element, can have a support foot (in particular as an integral part of the plinth element).

The base, in particular the plinth element and/or the rotary element, can have an indicator device for indicating a specific configuration of the seat element. The configuration preferably comprises an orientation of the seat element with respect to the base and/or an orientation of the rotary element with respect to the plinth element and/or a (correct) fastening of the base and/or a (correct) setting of a possibly available support foot.

The base, in particular the plinth element and/or rotary element, can comprise an anti-rebound device, in particular an anti-rebound bar (or anti-rebound projection). An anti-rebound device should be understood in particular as a device that at least partially absorbs (alleviates) a rebound of the seat element. A rebound may, for example, occur if the vehicle decelerates abruptly such that the seat element is accelerated forwards relative to the vehicle and owing to the holding devices moves backwards (with respect to the vehicle) (or rebounds) again at a later point in time.

The base, in particular the rotary element, can have at least one fastening device for fastening a seat element or at least two or more fastening devices (for such fastening). A first fastening device can possibly be designed (in particular only) for fastening one (the) first seat element. A second fastening device can be designed (in particular only) for fastening one (the) second seat element. Different seat elements can be used flexibly and variably as a result. This aspect is also optionally disclosed and claimed as an independent aspect of the invention.

At least one fastening device can be configured for fastening two or more (different) seat elements. A plurality of fastening devices can be configured both for fastening one and for fastening at least one other seat element.

The base (in particular the rotary element) can possibly also have a further (the second and/or a third) fastening device or a plurality of further fastening devices, in order together with the first fastening device to fasten the seat element with increased safety on the base and/or in order to fasten another seat element (a second group of seats).

The (respective) fastening device can have one or a plurality of locking elements, for example one or a plurality of hooks, in particular for engaging around one or a plurality of bars attached (to a base) of the seat element.

The first and/or second seat element, possibly including rotary element, can be locked in at least (or exactly) two different orientations, or in at least four (or exactly four) different orientations, in particular in such a manner that the lock is releasable only by means of operating a locking device, wherein the locking device is movable (in particular can be moved in a translatory manner and/or rotatable) in particular with respect to the base (if it is fastened thereto) and/or is movable (in particular can be moved in a translatory manner and/or rotatable) with respect to the seat element and/or rotary element, if it is fastened to the seat element and/or rotary element. The two different orientations can in particular be a forwards orientation and a backwards orientation. An optional third or fourth orientation can be an orientation that extends (angularly), in particular exactly, between the forwards and backwards orientation, i.e. in particular at a 90° angle thereto.

Alternatively, or in addition, the first and/or second seat element, possibly including rotary element, can be set in at least or exactly two different orientations, in particular in such a manner that the setting can (exclusively) be cancelled by means of a rotation of the first or second seat element and/or rotary element. This/these orientation(s) is/are preferably located (angularly), in particular exactly, between the forwards and backwards orientation, i.e. in particular at a 90° angle thereto.

In generally, setting should be performed by interlocking devices (elements), which are preferably rigidly connected to that element (base, in particular plinth and/or rotary element, or seat element), on which they are arranged. Setting can in particular be performed by a combination of projection and corresponding recess/opening, wherein the projection can be provided on the base, in particular on the plinth element, and the recess on the seat element or rotary element (or vice versa). Intermediate orientations (angularly between the forwards and the backwards orientation, but not exactly comprising the forwards or backwards orientation) can preferably in particular be set in this respect, in particular orientations at a 90° angle to the forwards or backwards orientation, in particular in both lateral directions.

Setting can in particular be performed by a soft lock.

Preferably, at least one first and/or at least one second locking device for releasing and/or producing a lock of an orientation of the seat element and/or of the rotary element is provided.

The first and/or second locking device is/are preferably arranged on the base, in particular an upper side of the base, and/or on the seat element, in particular a lower side of the seat element and/or on the rotary element, in particular a lower side of the rotary element.

The first and/or second locking device can be arranged in a region, which is covered by the first and/or one/the second seat element in a mounted state, preferably projecting from the respective upper side or lower side.

The locking device can preferably assume a first state, in which the seat element, in particular including rotary element, is locked (rotationally) with respect to the plinth element and a second state, in which a rotation is enabled. The (respective) locking device can in particular be transferred between a first position (which it can occupy in the first state) and a second position (which it can occupy in the second state), for example, by means of rotation and/or translation (possibly both with respect to the plinth element and in respect to the seat element or the rotary element).

One or a plurality of (or all) locking devices (at leas in the second state) project upwards (for example through openings, in particular through slots) and are therefore particularly suited to be moved and/or rotated (possibly further or completely) from an exterior surface of a seat element fastened on the base with respect to the base or the plinth element (such that they are transferred from their first into their second position).

At least one, a plurality of or all locking devices can be prestressed in the direction of their first position, e.g. by means of a spring.

In concrete embodiments, at least one, a plurality of or all locking devices can have (distal) ends (in particular of a lever arm), which lie in several positions (in particular the first and second upper position) below a bearing surface (rotational surface) of the base (in particular a corresponding bearing/rotational surface of the rotary element). In the first position, the corresponding locking device can engage with a counter structure (e.g. a depression, an opening, a hole or the like) of the plinth element of the base and thus prevent (lock) a rotation, whilst it is moved away from the counter structure in the second position (of the corresponding locking device), thereby enabling a rotation.

The base is preferably suited to accommodate at least one seat element in at least two different states, specifically a locking state, in which, for example, an external surface (e.g. lower and/or rear surface) of the seat element does not press against an assigned locking device (in particular, presses a proximal end of the assigned locking device) and a rotational state, in which, for example, the external surface of the seat element presses against the assigned locking device(s) (in particular of a, possibly proximal, end, e.g. of a further lever arm, thereof), thus moving the locking device into its second position.

In a concrete embodiment, the release and/or production of a lock can be operable by means of adjusting a configuration, in particular an inclination, of the first and/or second seat element, in particular by adjusting a configuration, preferably inclination, of the first seat element. The (corresponding) seat element can preferably be moved into a maximum upright position (which is possibly no longer lockable, therefore is not intended in particular for permanent use and can lie above the maximum position of use), wherein rotational blocking is triggered and the seat element can be correspondingly rotated (possibly with the rotary element). Once the inclined position has assumed a position of use again (which can possibly be brought about by the weight force and/or a prestressing device, in particular spring device), the rotation is blocked again.

One or a plurality of or all locking devices can be operable manually, preferably by means of one/the manual operating device, in particular by means of a sliding device, towing device and/or rotary actuator. Such manual operation can act on the same locking device(s), as well as the operation via the adjustment of the configuration (inclination) of a seat element. Alternatively, various locking devices can also be provided, wherein a first locking device (or a first group of locking devices) can be operated by adjusting the configuration (inclination) of a seat element, in particular of the first seat element (or can in particular exclusively be operated thereby) and a second locking device (or a second group of locking devices) can be operated by means of a manual operation (can possibly be operated exclusively by means of a manual operation).

In general, one, a plurality of or all locking devices can be rotatable and/or translationally movable in order to release and/or produce the lock.

A first and a second locking device can possibly be arranged or designed to be mirror-symmetrical with respect of one another.

Two or more locking devices can be coupled to one another, particularly in the sense that an operation of a first locking device also leads (automatically) to a change in state of the second locking device (or its operation).

A corresponding coupling can be carried out, for example, by means of a coupling bar (in particular for the rotational coupling or torque coupling).

A first operating device, in particular one/the (first) manual operating device, for releasing and/or producing a lock of the orientation of the seat element and/or of the rotary element, is preferably arranged in a first lateral region of the base, in particular of the plinth and/or rotary element. Optionally a second (corresponding) operating device is arranged in a second lateral region, located opposite the first region, of the base, in particular of the plinth and/or rotary element. A lateral region of the base should be understood in particular as a region, which extends from a point, protruding furthest laterally, of the respective element or of the respective device no further than up to 20% of a distance up to the opposite point protruding furthest, preferably no more than 10%. In particular, a lateral region can be defined as being covered with a first (larger) seat element and remaining exposed with a second (smaller) seat element.

Alternatively, or in addition, at least one (in particular at least a third) locking device for releasing and/or producing a lock of the orientation of the seat element and/or of the rotary element can be arranged in a (the) first lateral region of the base, in particular of the plinth and/or rotary element and optionally a corresponding fourth locking device can be arranged in a (the) second lateral region, located opposite the first region, of the base, in particular of the plinth and/or rotary element.

A lateral arrangement of one or a plurality of or all locking elements, in particular a lateral arrangement of one, a plurality of or all operating devices can, in a simple manner, lead to the corresponding locking and/or operating device being accessible in the case of smaller (narrower) child seats (but not in the case of larger seat elements).

In general, one or a plurality of or all locking devices (in particular the at least one first and/or second and/or third and/or fourth locking device) can be manually operable, for example by means of an actuator (e.g. a button, a slide and/or a switch), wherein preferably a double action can be necessary therefor or the operating device (the actuator) can be correspondingly configured. Double action should be understood in particular as simultaneously or successively performing two actions (in order make inadvertent operation more difficult).

A (respective) manual operating device for one or a plurality of or all locking devices (in particular of the third and fourth locking device), e.g. the abovementioned actuator, can preferably be provided at a position of the rotary element, which is situated when orienting a seat element to be fastened on the base in or counter to the direction of travel of the vehicle in the lateral direction, i.e. in and counter to the direction of the doors, adjacent to the seat, of the vehicle.

At least one, or a plurality of or all locking devices (further preferably the at least one third and at least one fourth locking device) is/are preferably connected to one another, such that when transferring one of the locking devices from its first into a second position, both (all) locking devices are transferred. Specifically, the locking devices can be connected (or coupled) by a bar.

At least one first (or at least one group of first) locking device(s) can be configured to cooperate with one (the) first seat element (in particular exclusively to cooperate therewith). At least one second (or one second group of) locking device(s) can be configured to cooperate with one (the) second seat element (in particular exclusively to cooperate therewith).

In embodiments, at least one fifth and/or sixth locking device can be provided. Preferably, the fifth locking device is designed to prevent, in a part of the configurations of a headrest of the seat element possible in the first orientation, the seat element from being rotatable from the first into the second orientation. Alternatively, or in addition, the sixth locking device can be designed to prevent a part of the configurations possible in the first orientation being adjustable in the second orientation.

In general, different configurations, in particular relating to a height of the headrest, can be adjusted in the case of the headrest of the seat element in the first orientation. In this respect, the previously mentioned configurations are in particular configurations of the headrest, in particular of a height of the headrest.

The fifth and/or sixth locking device if preferably independent of the further abovementioned locking devices (in particular the first to fourth locking devices). The fifth and/or sixth locking device can in particular be designed as in DE 20 2016 104 181 U1 (referred to there in particular as block devices). The fifth and/or sixth locking device may be controlled, as described in DE 20 2016 104 181 U1, by means of a headrest, but also by means of any other mechanism, for example by means of an actuator provided for this purpose. If in contrast to DE 20 2016 105 181 U1, the base can be separated from the seat elements which can be fastened thereon, the means for blocking the rotation can be provided in the base. A transfer of the control can be carried out in a similar fashion to the control described in DE 20 2016 104 181 U1, wherein the corresponding control means (e.g. bars) can possibly engage through plinth element of the base or can be arranged there.

The second seat element can be configured such that it does not have a suitable structure (external surface) for transferring the corresponding locking device, at least does not have a suitable structure for transferring at least one first and/or at least one second locking device.

The first and third locking device, on the one hand, and/or second and fourth locking device, on the other hand, can be identical, such that they (with a first seat element) are operable both by means of the seat element itself and (with a second seat element) by means of a manual operating device (e.g. an actuator). The first seat element can fully or partially cover a manual operating device, e.g. the actuator (possibly in any orientation), such that an operation is impossible or (significantly) impeded.

The first orientation corresponds in particular to a configuration of the child seat, in which the seat element is facing backwards. The second orientation corresponds in particular to a configuration of the child seat, in which the seat element is facing forwards.

The child seat can be rotated into a third orientation, wherein the third orientation preferably lies between the first and the second orientation, in particular is rotated with respect to the first and/or second orientation by 90°.

According to a fifth independent aspect of the invention (which, however, can also be combined with one or a plurality of the abovementioned aspects, in particular the first and/or second and/or third and/or fourth aspect), the following is proposed: a child seat system, comprising at least one (first) seat element and one base, which can be attached to a vehicle seat, wherein the base has a support and/or stabilizing element, in particular a support and/or stabilizing fin, for supporting and/or stabilizing the seat element, if the latter is on the base.

A central idea of the fifth aspect consists in a support and/or stabilizing element, in particular a corresponding fin, being proposed, which represents a part of a carrying (supporting) structure for the seat element.

For this purpose, the support and/or stabilizing element preferably protrudes from the base, in particular from a (the) rotary element of the base, upwards, for example, by at least 10 cm, preferably at least 20 cm. In a mounted state, the seat element abuts the support and/or stabilizing element. The support and/or stabilizing element, in particular the fin, can be arranged on a (in respect to the direction of travel) front end (in a concrete embodiment on the end, on which a support foot is also attached). Fastening devices for fastening the seat element can be provided (directly) adjacent to the fin or on the fin integrated therein, such that the support and/or stabilizing element (the fin) abuts a rear wall of the seat element or is inserted therein and thus its support or stabilizing effect can be deployed.

The support and/or stabilizing element (in particular the fin) preferably has a reinforcing insert, in particular made of metal, which can possibly be surrounded by another material (e.g. plastic). The reinforcing insert can be bow-shaped or (at least substantially) plate-shaped and possibly correspond to the shape of the overall support and/or stabilizing element (in particular the fin) or at least replicate it. The support and/or stabilizing element (fin) preferably has an upwardly tapering shape. The support and/or stabilizing element (the fin) can overall have a rounded shape. Furthermore, the support and/or stabilizing element can extend over (at least at its lower end) at least 10%, preferably at least 20%, further preferably at least 50% of a width of the base (maximum width of the base). The support and/or stabilizing element (the fin) is preferably provided on a base, which has a rotary element and a plinth element (as described above). The support and/or stabilizing element (the fin) is preferably on the rotary element. This means in particular that the support occurs for the purpose of stabilization at a suitable point. Alternatively, the support and/or stabilizing element (the fin) can be arranged on the plinth element.

Furthermore, the support and/or stabilizing element (the fin) can be used as an interface for transferring settings of the seat element with respect to the base. One possibility for this would be the transfer of a setting for ensuring or blocking a rotation of the seat (or change of the orientation), as described, for example, in DE 20 2016 104 181 U1. In this case, control can occur by means of a configuration (in particular height) of the headrest in accordance with DE 20 2016 104 181 U1, but also by means of another element, such as, for example, an actuator (button, switch, slider or the like) provided for this purpose.

In a concrete embodiment, the support and/or stabilizing device (fin) can have one or a plurality of (first) projections in an upper region and/or one or a plurality of lateral (second) projections. The first projection or the first projections and the second projection or the second projections can (in particular in the inside of the support and/or stabilizing device or the fin) be connected to one another, in particular in such a manner that they can be moved together in a (at least substantially) vertical direction with respect to the base between two positions. In a first (upper) position, a (complete) lock of the seat may be present in this case, in a second (lower) position, by contrast, in a backwards facing orientation of the seat, only one rotation into an entry and/or exit position (e.g. 90° rotated) can be enabled. Alternatively, a (complete) blocking of the rotation would also be possible.

The base can contain means, which prevent a transfer of the projections from the first into the second position in the case of a forwards orientation. In this case, the seat element (in particular a seat element designed as a baby seat) can press on the first projections in the potentially only possible (facing backwards) position with respect to the base, thereby blocking the rotation. Alternatively, or in addition, an installation of the seat element (in particular of the baby seat) in the forwards orientation can be effectively prevented, as the projections cannot be transferred into the second position and the seat element (the baby seat) thus cannot be moved far (enough) downwards, in order to cooperate with locking devices of the seat. In contrast, a further seat element (e.g. a group II/III seat element) can, for example, cooperate with the second projections, which can be pressed down by appropriate corresponding elements, if the headrest or button etc. (see above) is moved into the corresponding position.

A further possibility for using the fin as an interface for transferring settings of the seat element would be the transfer of a side impact protection element from a storage position into a position of use. The trigger mechanism can be constructed exactly as described for blocking the rotation, i.e. by means of projections or else by means of recessed elements, which cooperate with projections on the seat. A switch, which controls on which side the side impact protection is transferred, may possibly be present on the support and/or stabilizing device (the fin), in particular on the part, which is covered in the case of an installed seat element. This is particularly advantageous in the case of seat elements for small children (in particular baby seats), as they are often removed from the base and the side impact protection is then usually transferred into the rest and/or storage position, in order to not be in the way. In general, a rest and/or storage position of the side impact protection element should be understood as a position of the element, in which said element protrudes less far (or not at all) in the lateral direction, than in the position of use.

Overall, the design of the support and/or stabilizing element (the fin) can lead to a weight of the seat element (in particular of a baby seat) being able to be designed to be comparatively small, since the seat element can be designed to be comparatively weak, as it is in any case correspondingly reinforced by means of the support and/or stabilizing element (the fin) when in use.

The abovementioned object is further achieved by means of a base for a seat element, wherein the base has the features described above (in particular in accordance with the first and/or second and/or third and/or fourth and/or fifth aspect). To the extent that the seat element is also described with respect to the abovementioned child seat systems, this preferably means for the base that it must be correspondingly configured, in order to correspondingly cooperate with the seat element (in particular to be correspondingly connected).

Further features result from the dependent claims.

The invention is outlined in more detail below based on an exemplary embodiment. In this connection:

The same reference numbers are used for identical and similar parts in the subsequent description.

Figure 1:
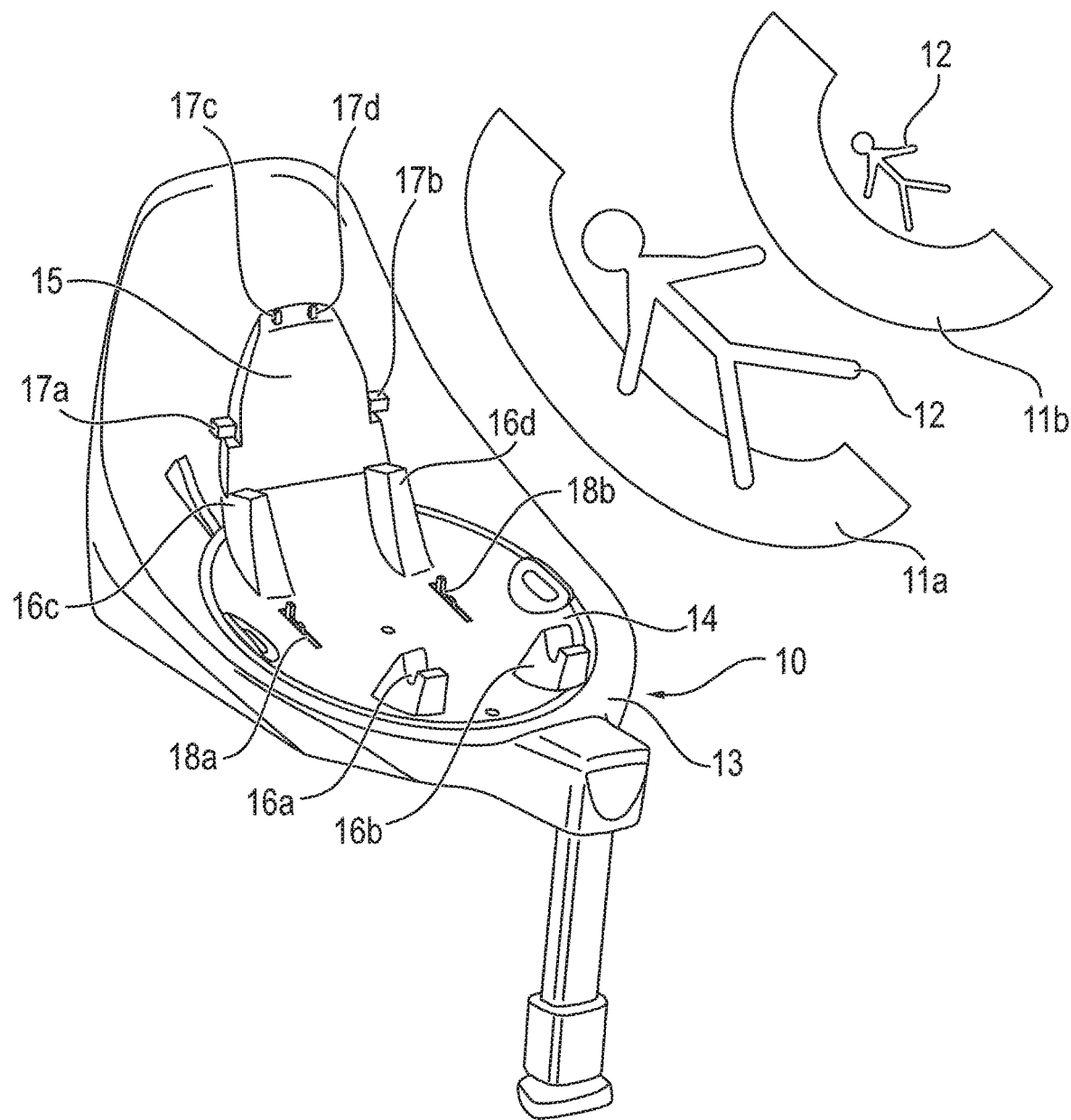
FIG. 1 shows an oblique view of a base according to the invention having a schematically illustrated seat element.

FIG. 1 shows an oblique view of a child seat system comprising a base 10 and a seat element 11a or 11b (indicated schematically), on which a child 12 can sit. The seat element 11a is configured for a larger child than the seat element 11b. The base 10 has a plinth element 13 as well as a rotary element 14, which can be rotated with respect to the plinth element 13. The rotary element 14 can, in principle, (depending on the conditions subsequently described in detail) be rotated at a 360° angle with respect to the plinth element 13 (about an at least substantially vertical rotational axis). The base 10, preferably the rotary element 14, has a fin 15, which protrudes upwards from the base 10, preferably from the rotary element 14. The fin 15 is designed such that it appropriately supports and stabilizes at least one seat element, which can be mounted on the base, for example a baby seat, such that a carrying structure of the seat element 11 is provided at least partially by the fin. Weight can thus be saved on the part of the seat element 11.

The base 10, in particular the rotary element 14, has fastening devices 16a to 16d. The fastening devices 16a, 16b can, in this case, accommodate a bar provided on the seat element 11a/11b. The fastening devices 16c, 16d too can accommodate a bar provided on the seat element 11a/11b, such that the seat element 11a/11b can be mounted on the base 10, in particular on the rotary element 14. In this case, only one type of mounting is preferably possible for all seat elements 11a/11b provided for the base 10, in which mounting the child is looking away from the fin 15. It would alternatively also be conceivable that owing to the fastening device 16a, 16b on the one hand, and 16c, 16d, on the other hand, a mounting rotated about 180° is allowed (in particular the fin 15 can then possibly also be dispensed with).

Since the fastening devices 16c, 16d are designed directly adjacent to the fin 15, the seat element 11 can correspondingly abut the fin (in particular its rear wall). Alternatively, the fin can also be inserted into the seat element (in particular a rear wall) and thus bring about its stabilizing effect.

The fin 15 is preferably in direction contact with a seat element 11 (for example, baby seat) over at least 10 cm$^2$, further preferably at least 20 cm$^2$, if it is mounted.

The fin 15 can be oriented at least substantially vertically, in particular at an angle of no more than 30°, further preferably no more than 20° with respect to the vertical. In so far as the orientation fluctuates, an orientation that arises through a connecting line between the upper and lower end of the fin should, in this case, in particular be valid.

The fin can extend in a (slightly) arcuate fashion, in particular in order to be as well adapted as possible to a likewise (slightly) arcuate outer wall of the seat element.

Furthermore, the fin 15 has lateral projections 17a, 17b and upper projections 17c, 17d. These projections are preferably connected to one another (in the inside of the fin), but are preferably able to move with respect to the fin 15 (i.e. are also moveable with respect to the base 10).

The projections 17a to 17d preferably allow in an (upper) position a complete rotation of the seat and in a second (lower) position only one rotation from at least a backwards facing position of the seat into an entry and exit orientation (rotated by 90°). Alternatively, a complete blocking of the rotation can also be possible in this case.

If a seat element (e.g. baby seat), in particular in a potentially only possible (backwards facing) configuration with respect to the base, presses on the projections 17c, 17d, a rotation can be blocked. At the same time, an installation of the seat element (of the baby seat) in the forwards facing state can be effectively prevented, as the projections cannot be transferred into the second position and the seat element (baby seat) cannot as a result be moved sufficiently far downwards, in order to cooperate with locking devices (to be described below) of the seat element with respect to the base. However, another seat element can cooperate with the projections 17a, 17b, which can be pressed down by corresponding elements of the further seat element, for example if the headrest or a button (etc.) is moved into a corresponding position.

A support foot 18 can further be arranged on the base 10, in particular on the plinth element 13.

In the configuration according to FIG. 1, a first seat element can in particular be mounted (in the forwards orientation), but a second seat element cannot, wherein the second seat element is preferably a baby seat and the first seat element a group II/III child seat. The second seat element (baby seat) is (also), in contrast, able to be mounted in a position of the rotary element 14, rotated by 180°, with respect to the plinth element 13.

Mechanisms for locking the rotary element 14 with respect to the plinth element 13 are subsequently described.

Figure 2:
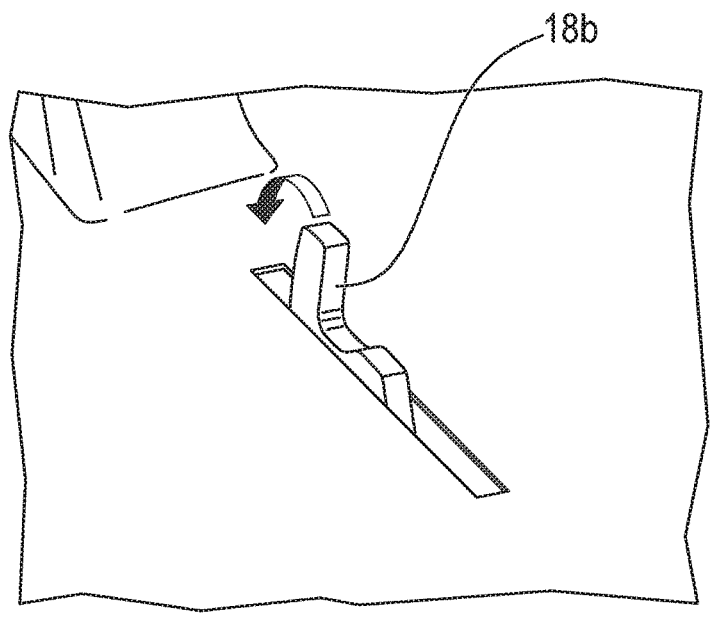
FIG. 2 shows a first section from FIG. 1.

For this purpose, locking elements 18a, 18b (see FIG. 1, enlarged for example in FIG. 2) are initially provided.

Figure 3:
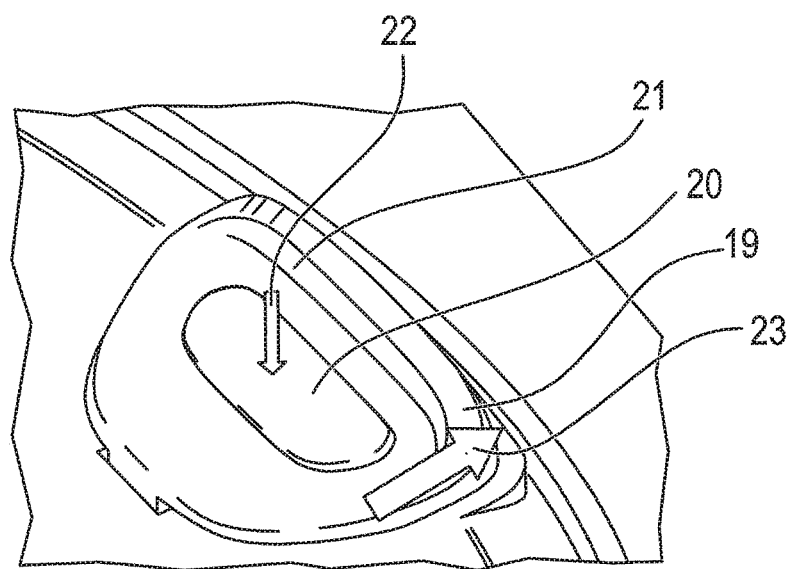
FIG. 3 shows a second section from FIG. 1.

These can, on the one hand, be operated by means of a manual operating device 19, in particular comprising a button 20 as well as a slider or puller 21, wherein corresponding movements are indicated by arrows 22, 23 (see FIG. 3).

Figure 4:
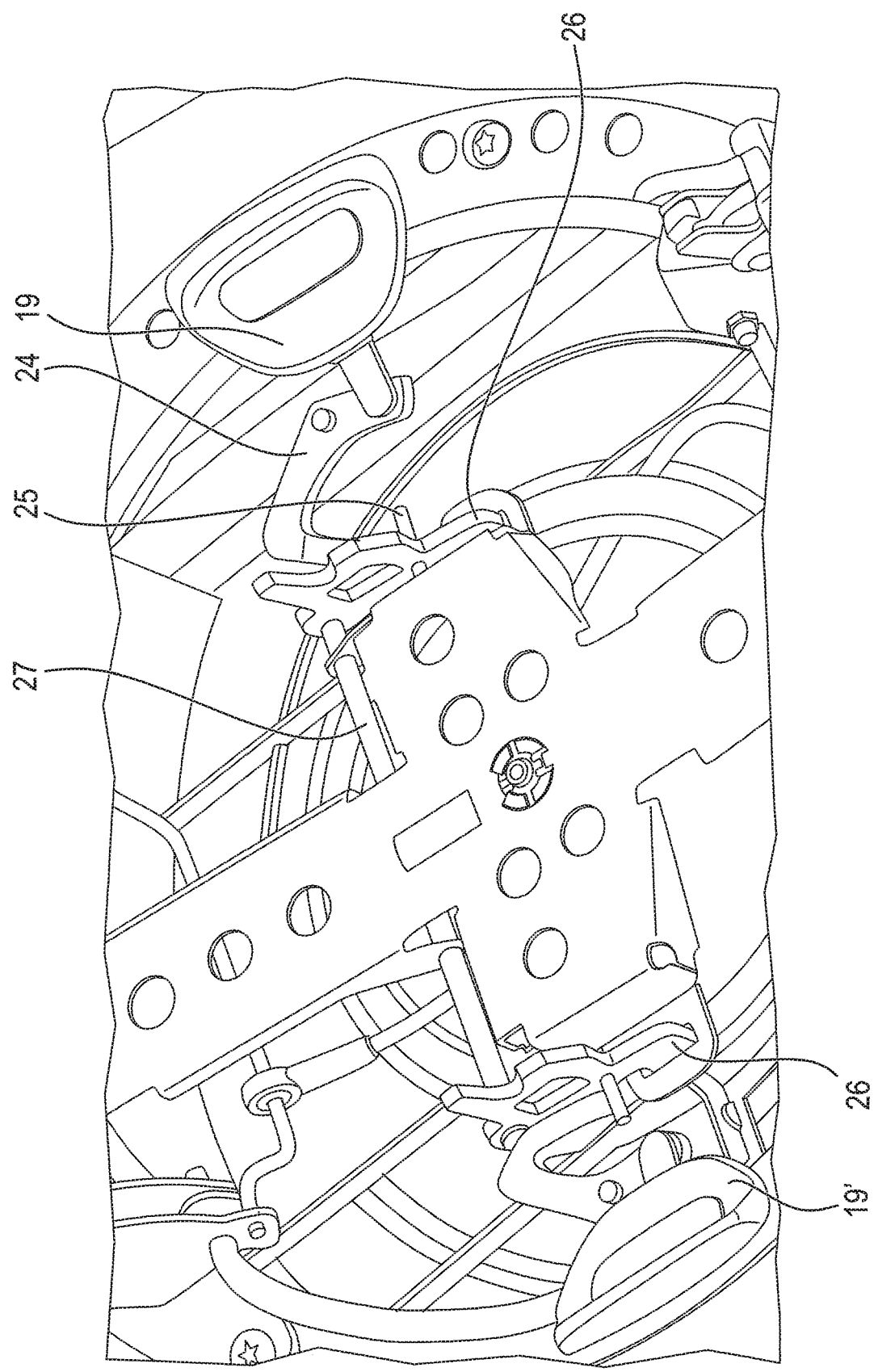
FIG. 4 shows a third section from FIG. 1.

It can be seen in FIG. 4 that pulling/sliding on the slider or puller 21 has the effect of a hook-shaped oblique element 24 pressing against a pin 25 of the locking element 18b from below. As a result, a locking hook 26 of the locking element 18b rotates from a corresponding recess (which cannot be seen in detail in FIG. 4) on the plinth element 13. Since the locking element 18a is connected to the locking element 18b via a bar 27, the locking element 18a also rotates automatically out of its locked position and the rotation of the rotary element 13 with respect to the plinth element 14 is enabled. This enabling can similarly also be performed by means of a (mirror-inverted) operation of a manual operating device 19' (located opposite the manual operating device 19).

Figure 5:
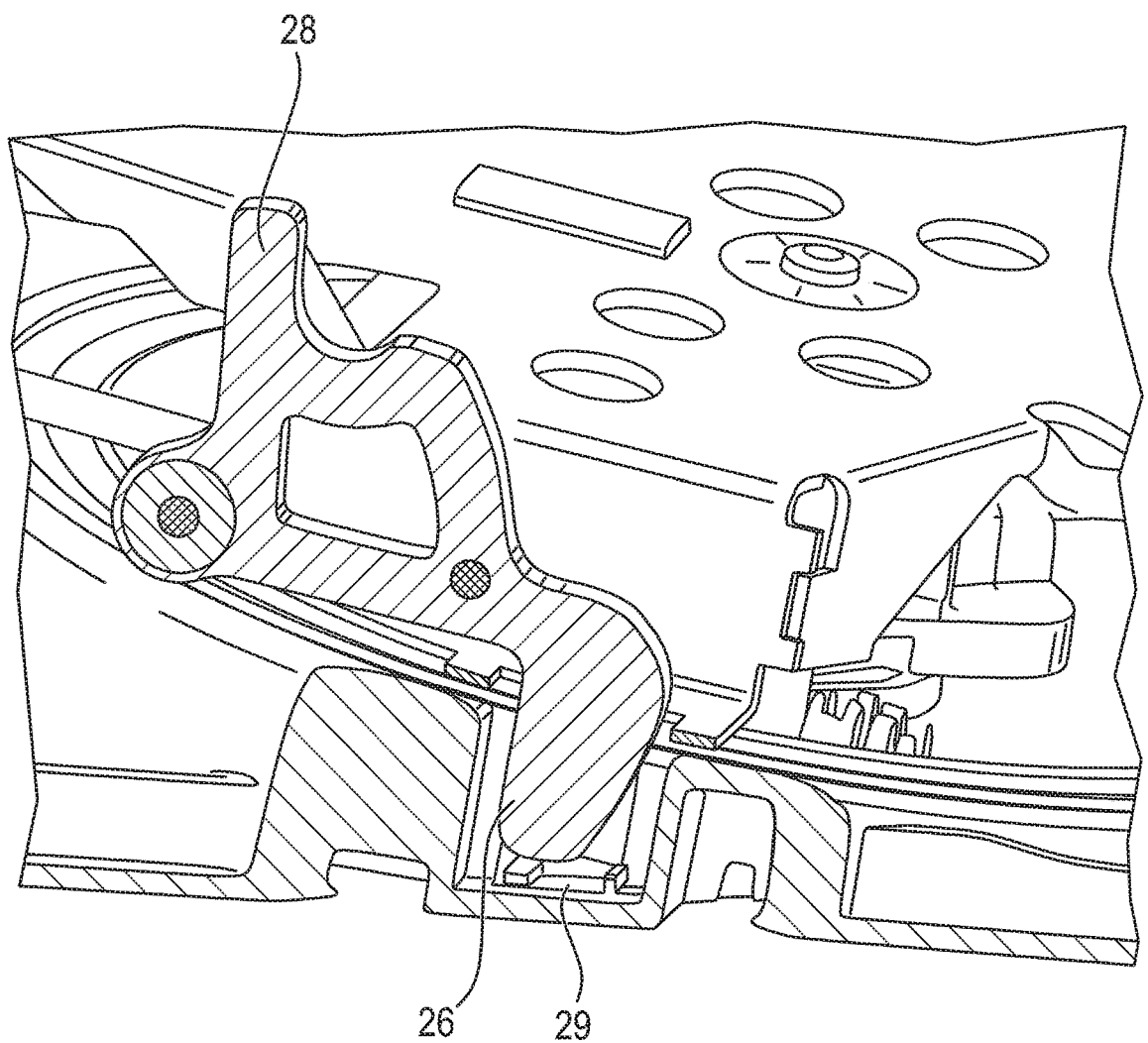
FIG. 5 shows a part of a further section from FIG. 1.

An alternative operation for the locking devices 18a, 18b can take place such that a seat element (in particular a group II/III child seat) presses against a lever arm 28 (see FIG. 5), in a specific configuration of the seat element, such that by moving the lever arm 28 (in FIG. 5 a pivot to the left) the locking hook is led out of the recesses 29 which can be seen in FIG. 5. In this case, the seat element can, possibly at the same time, act on both locking elements 18a and 18b (designed similarly or mirror-inverted). However, owing to the bar 27, acting on just one of the locking elements 18a or 18b also possibly suffices.

As can be seen in FIG. 1, the rotary element 14 has a cover 29. An (in particular metallic) inner construction of the rotary element 14, which in particular comprises an inner construction of the fin and an inner construction of the remaining components of the rotary element, can be provided.

Further views of the base according to the invention are shown in FIGS. 6 to 15, wherein here the cover parts, in particular the cover 29 have been removed.

Figure 6:
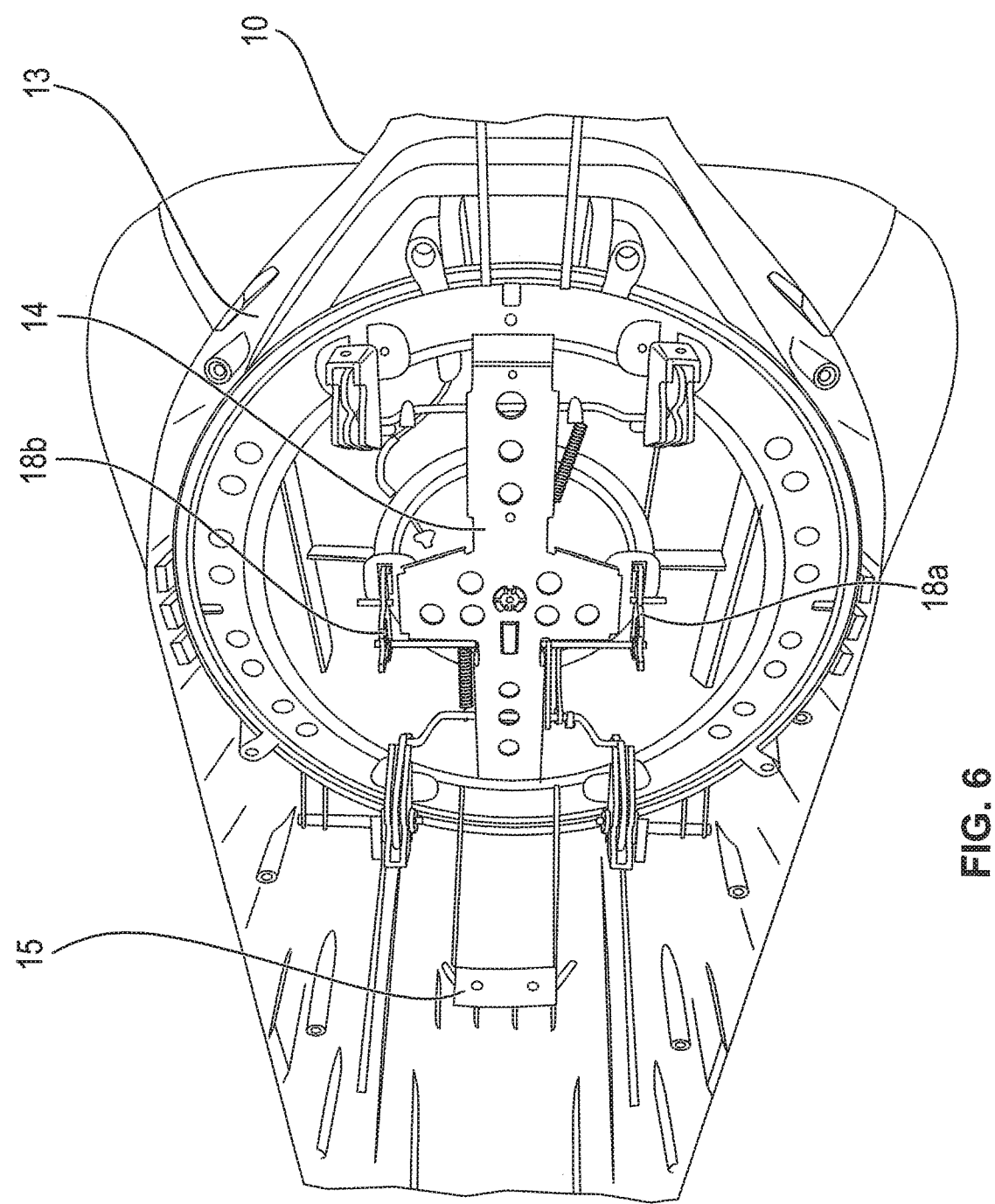
FIG. 6 shows an oblique view onto a base according to the invention, wherein an inner part is partly released.
Figure 7:
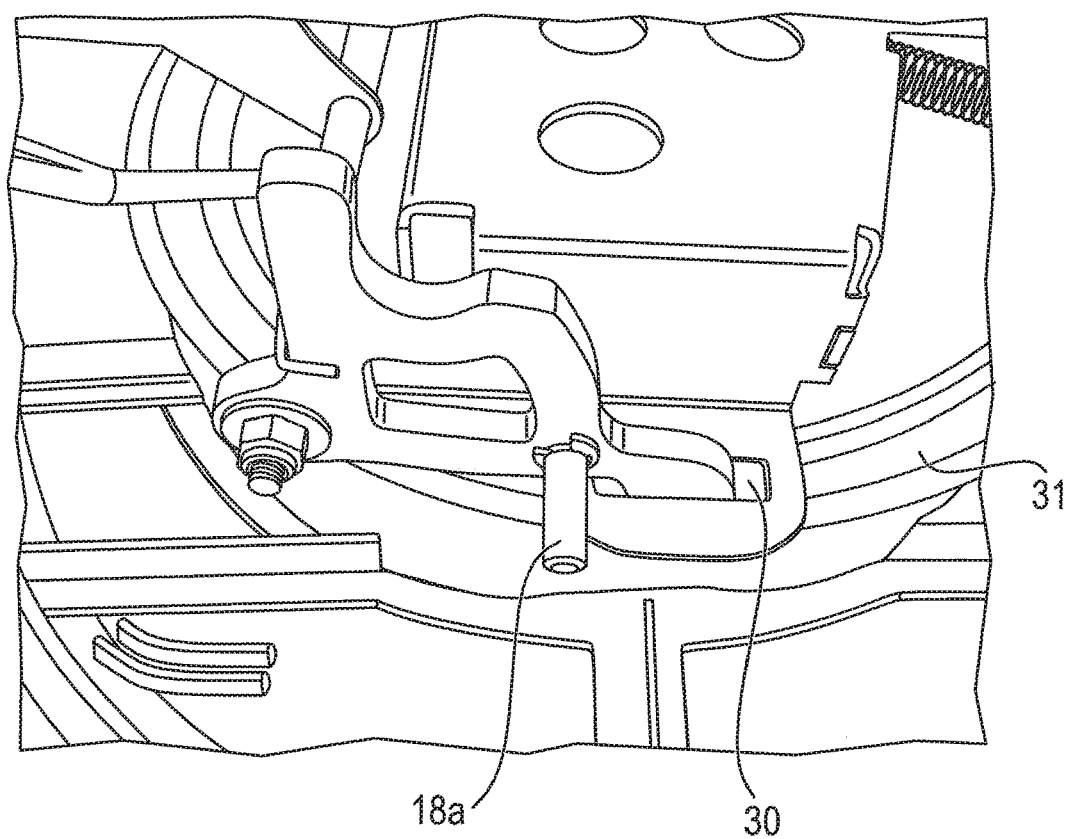
FIG. 7 shows an enlarged illustration of a detail from FIG. 6.

The seat base 10 is shown in a forwards orientation in FIG. 6, wherein the locking elements 18a, 18b are in a locked state. One of the locking elements, namely the locking element 18a, can be seen in the detail view according to FIG. 7. An optional slot-like hole 30 can further be seen, which, however, is merely a component of an optional screen 32, which rotates together with the entire rotary element 13. The actual counter structure is a hole (concealed by the screen) in an underlying ring 31.

Figure 8:
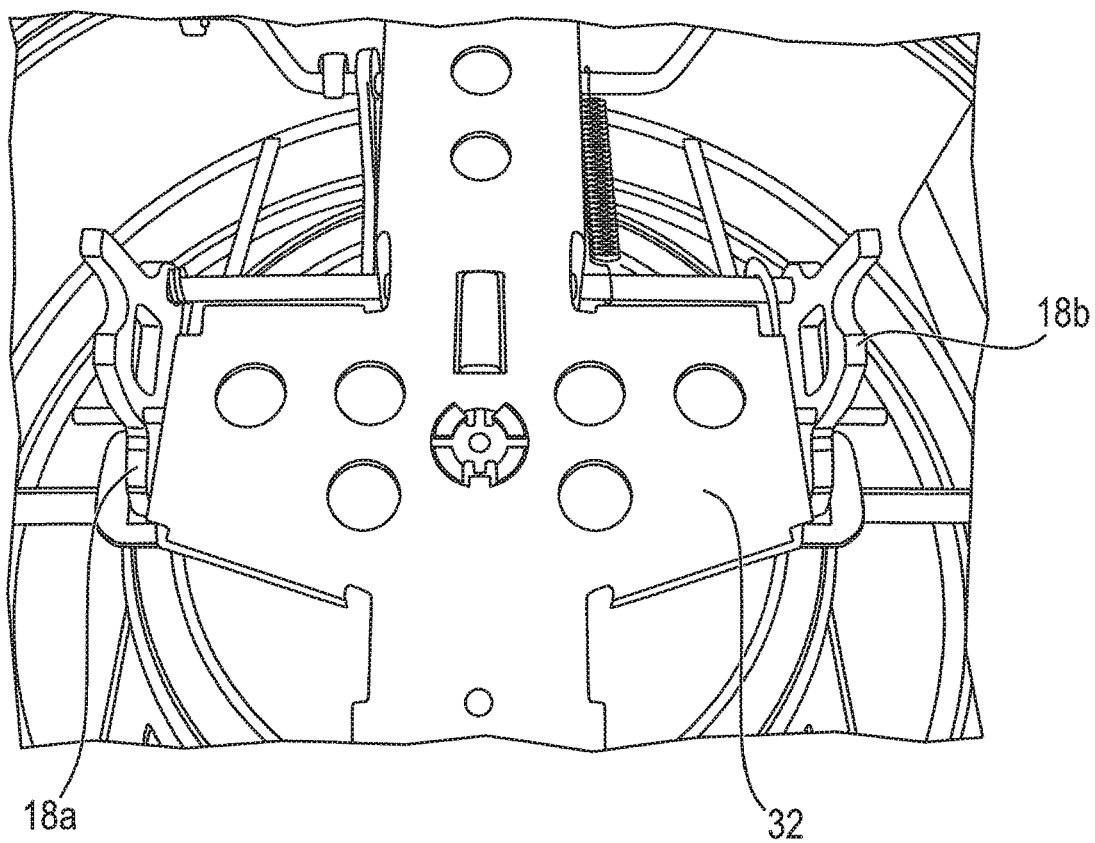
FIG. 8 shows an enlarged illustration of a detail from FIG. 6.

The locking elements 18a, 18b can be seen again in FIG. 8, wherein here too the screen 32 (as an in particular cross-shaped element) can be seen.

Figure 9:
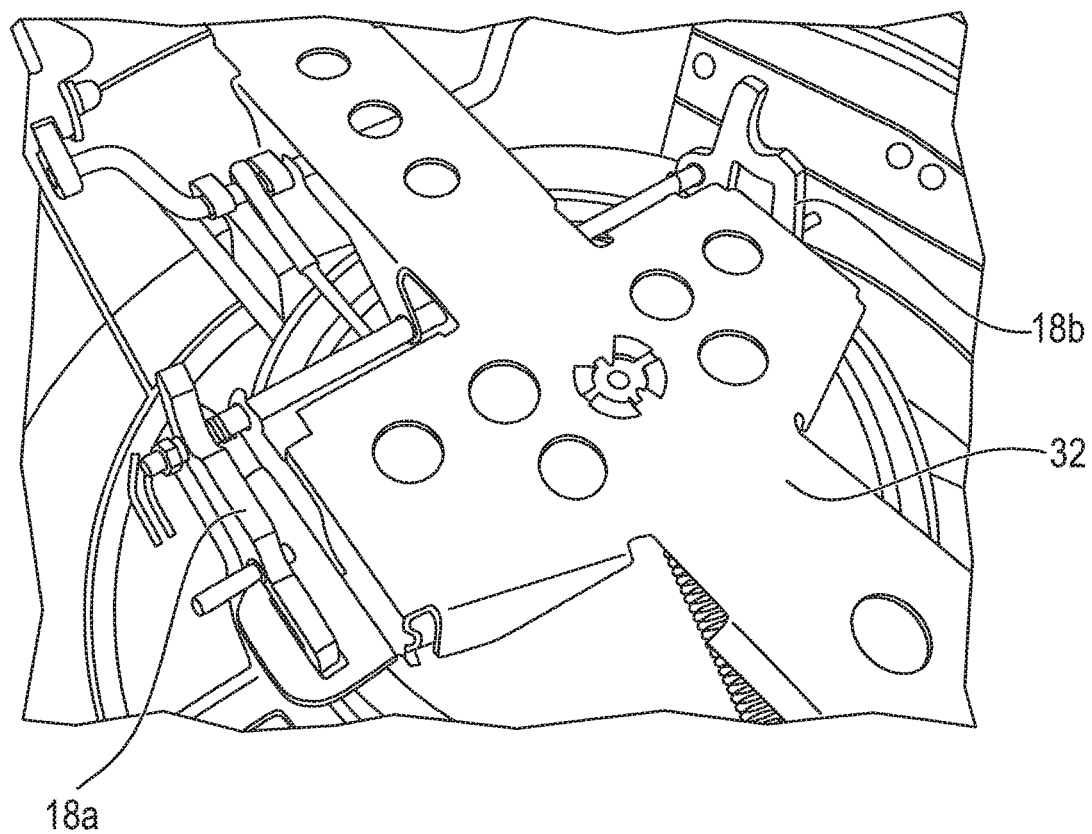
FIG. 9 shows an enlarged illustration of a detail from FIG. 6 or a perspective view of FIG. 8.

FIG. 9 shows a view similar to FIG. 8, but from another perspective.

Figure 10:
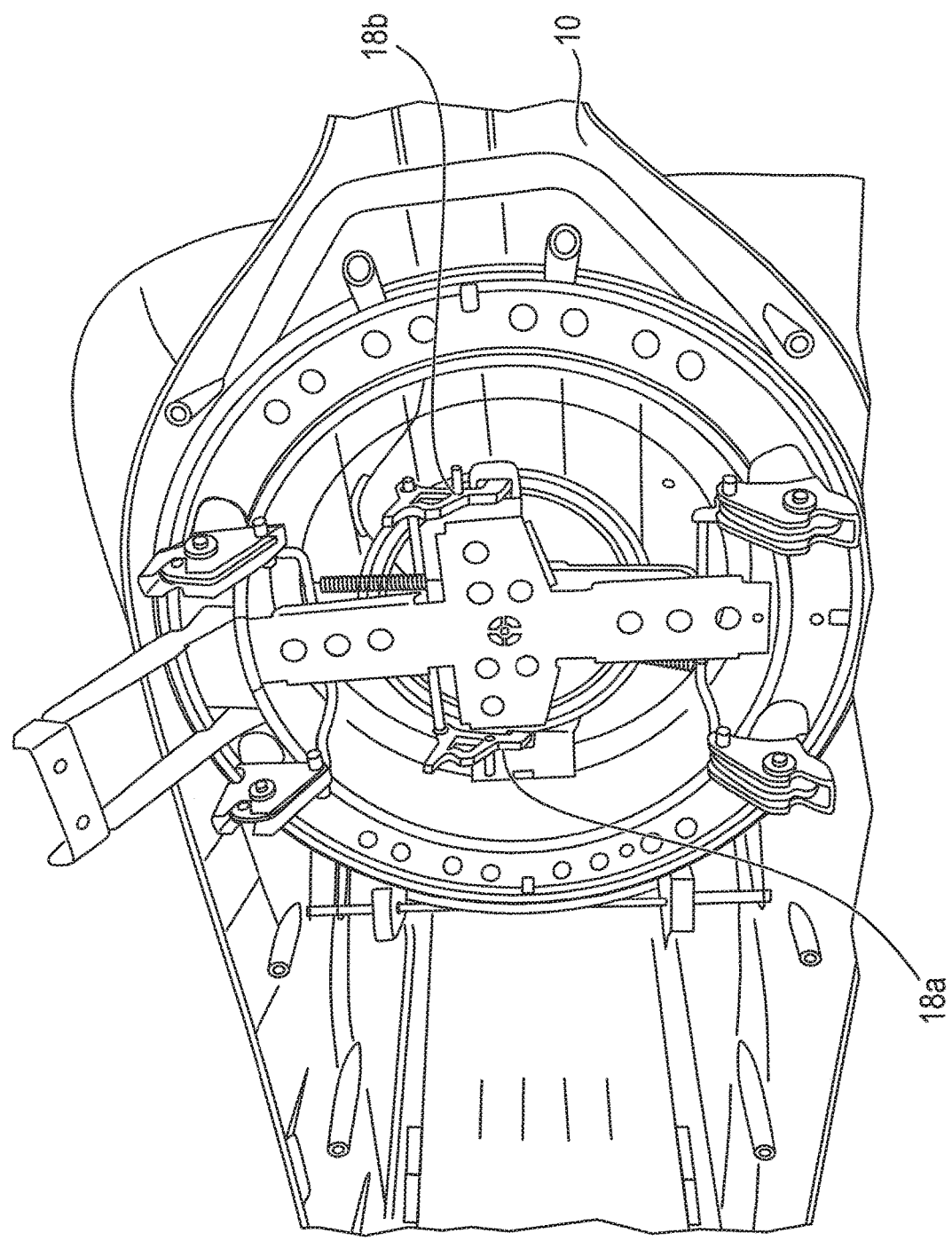
FIG. 10 shows a view of the base according to the invention (with partially released inner part or without cover) in an entry and/or exit position.

FIG. 10 shows a further overview of the base 10 according to the invention (without covers) in an entry and/or exit orientation, wherein the locking elements 18a, 18b are in the unlocked state.

Figure 11:
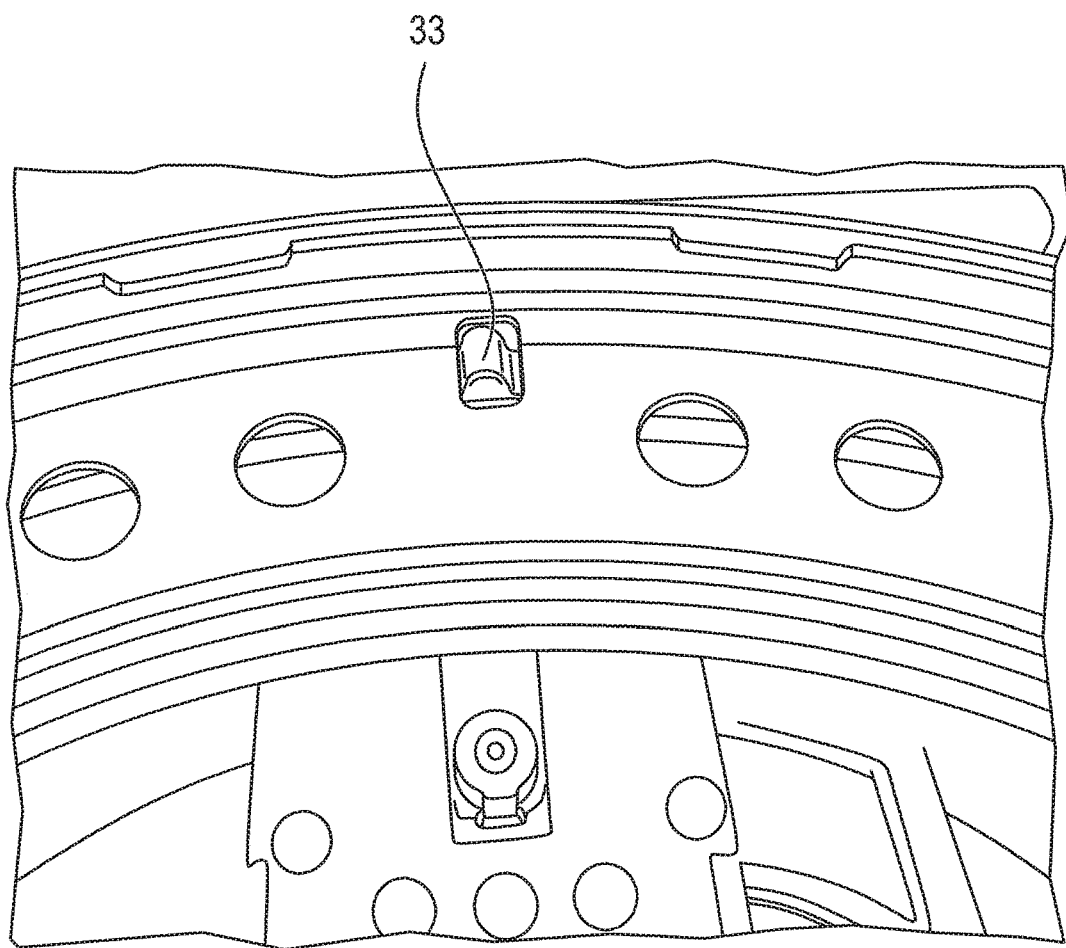
FIG. 11 shows an enlarged illustration of a detail from FIG. 10.

A pin 33, which forms a soft lock in the configuration according to FIG. 10, can be seen in FIG. 11. It can be seen that an (upper) surface of the pin 33 is rounded, such that the setting (soft lock) can be overcome by lateral forces (as a result of a rotation of the rotary element 14 with respect to the plinth element 13).

Figure 12:
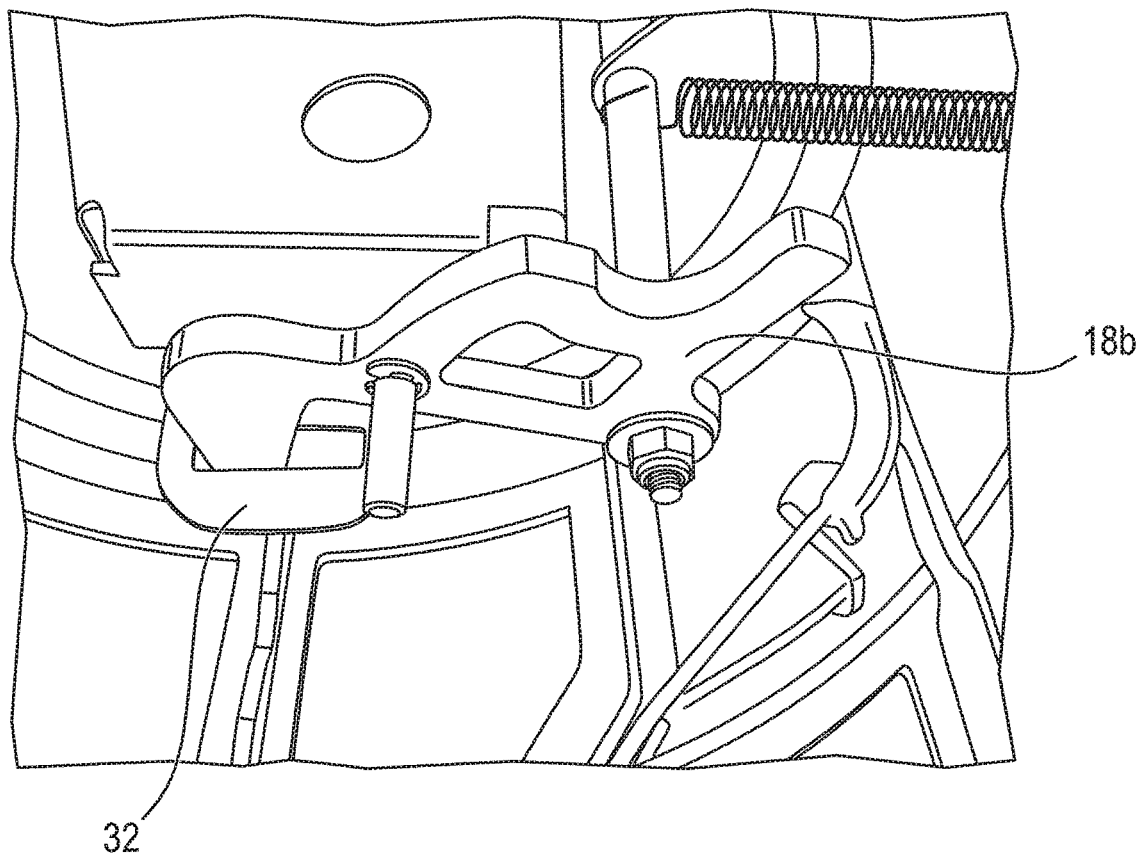
FIG. 12 shows an enlarged illustration of a detail from FIG. 10.

The locking element 18b can be seen in an unlocked state in a detail view according to FIG. 12. Although the locking element 18b preferably engages through the screen 32, it rests on the ring 31. In comparison to FIG. 7, the locking element 18b is considerably pivoted.

Figure 13:
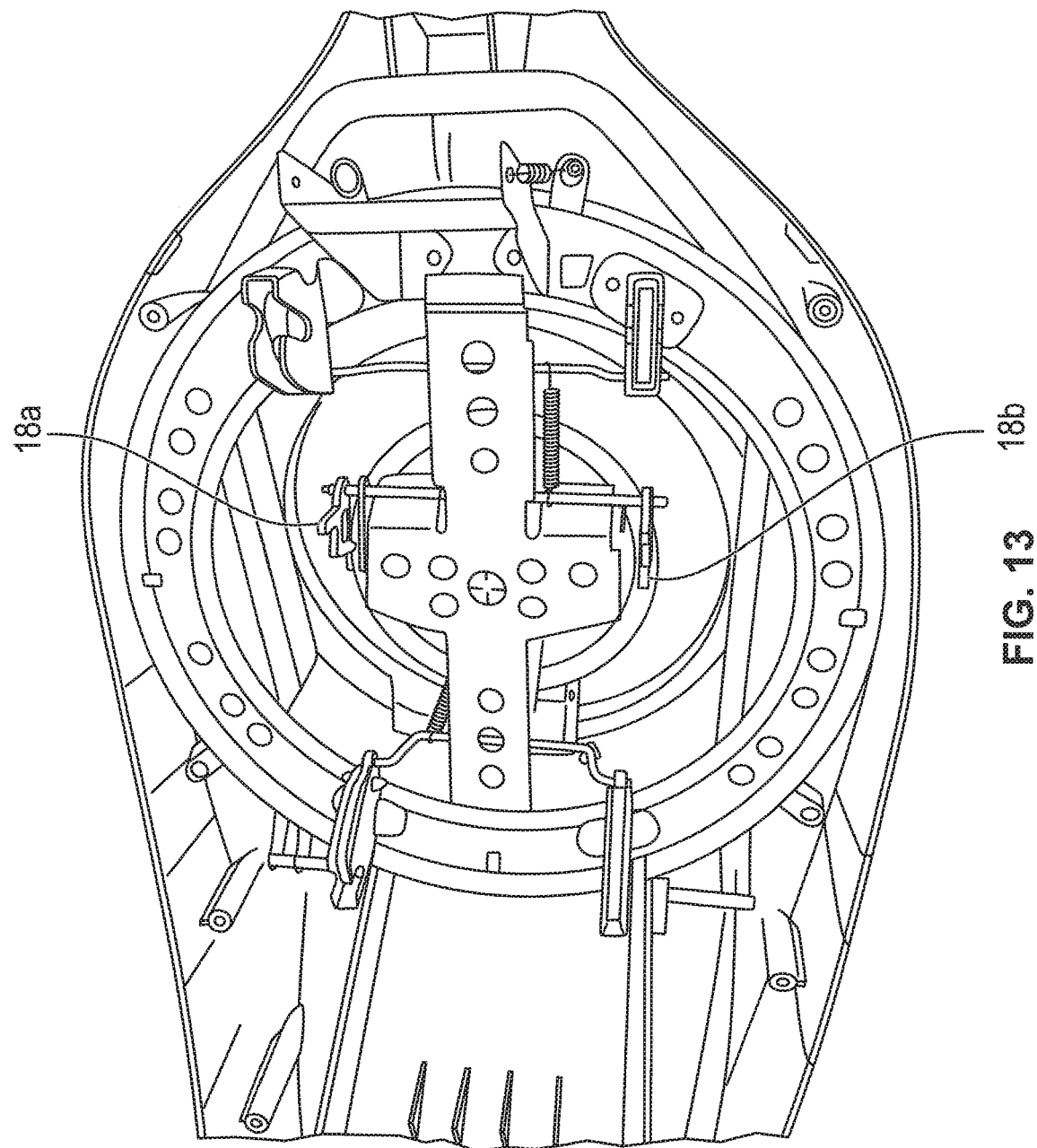
FIG. 13 shows a view of the base according to the invention similar to FIG. 10, wherein the locking elements are in a divergent state.

FIG. 13 shows an overview of the base 10 in a backwards orientation, wherein the locking elements 18a, 18b are in a locked state.

Figure 14:
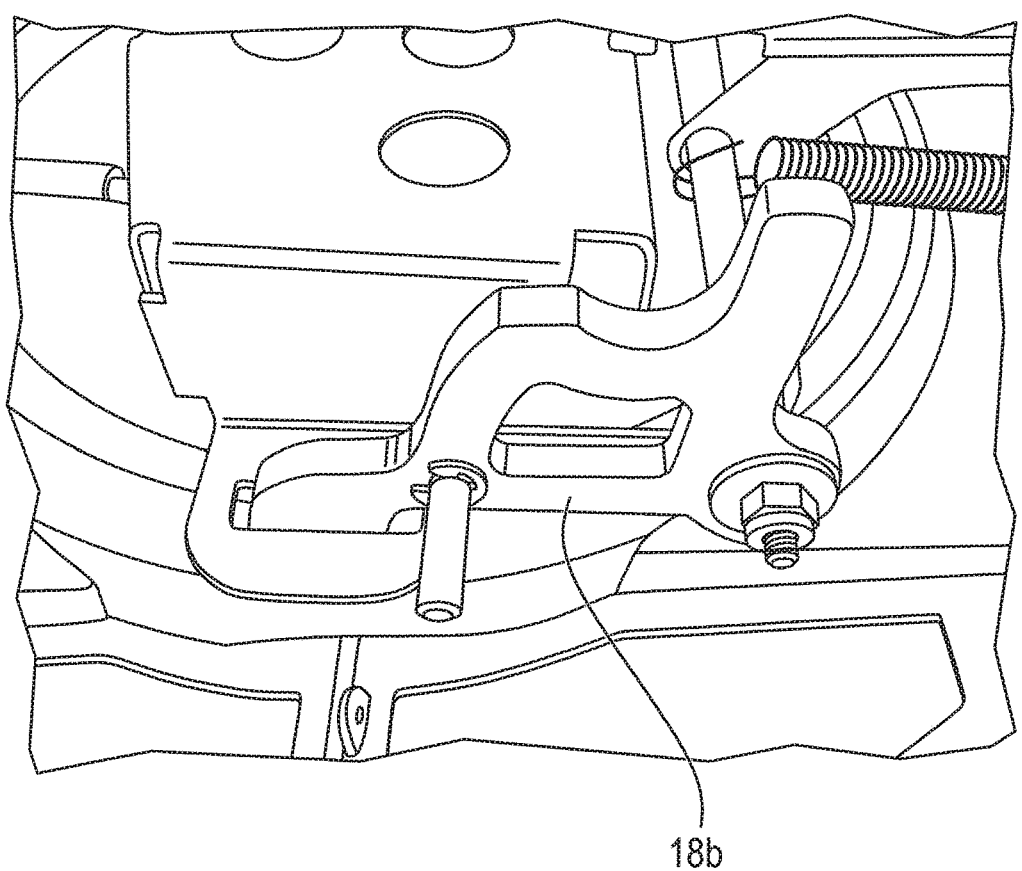
FIG. 14 shows an enlarged view of a detail from FIG. 13.

FIG. 14 shows a detail view from FIG. 13, namely the locking element 18b in a locked position.

Figure 15:
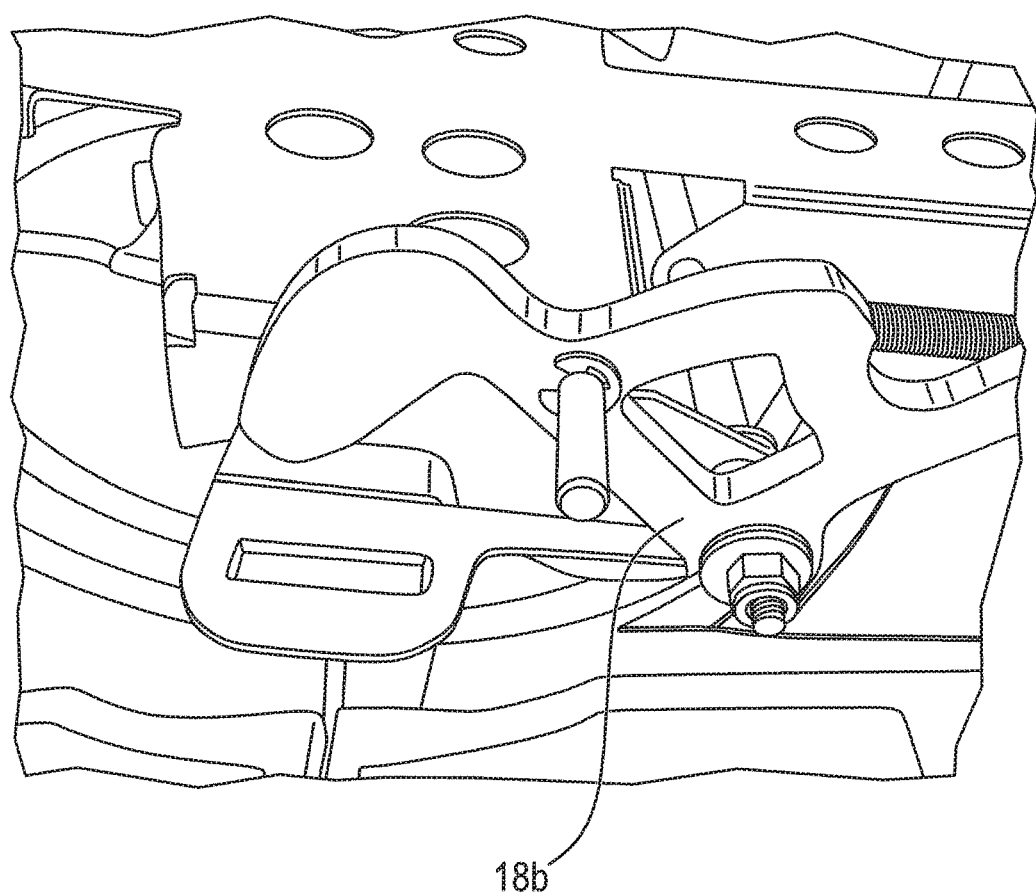
FIG. 15 shows an enlarged view of a detail from FIG. 13.
Figure 16:
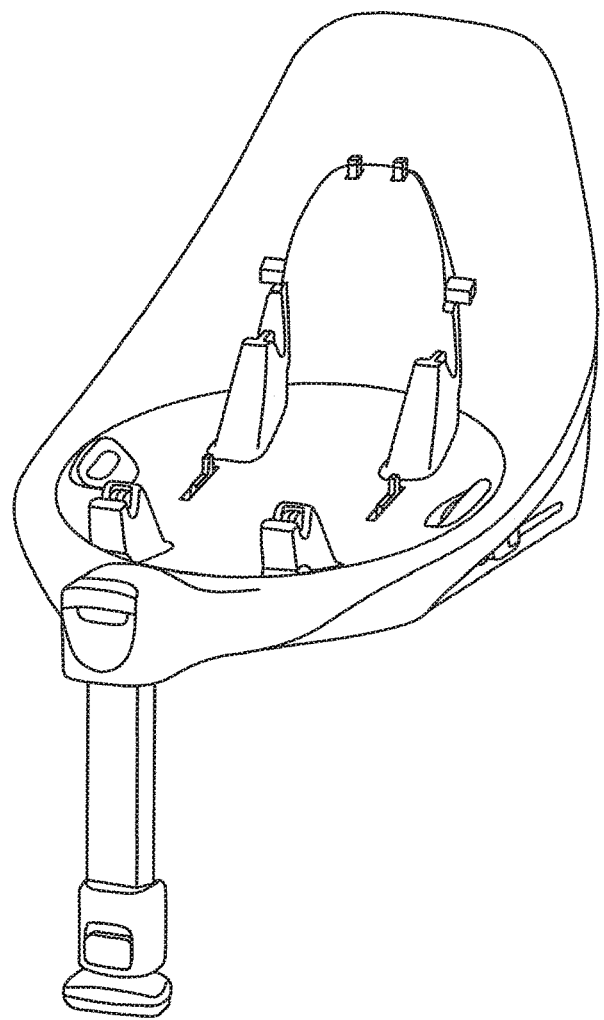
FIG. 16 shows an oblique view similar to FIG. 1.

FIG. 15 shows a view similar to FIG. 14, wherein in contrast to FIG. 14 the locking element 18b is in a (significantly) unlocked position and enables the view on the counter structure (the hole in the ring 31 below the screen 32).

It should be noted at this point that all the above-described parts by themselves and in any combination, in particular the details illustrated in the drawings, are claimed to be essential to the invention. Modifications therefrom are common for a person skilled in the art.

REFERENCE NUMBERS 10 base
11 seat element
12 child
13 plinth element
14 cover element
15 fin
16a fastening device
16b fastening device
16c fastening device
16d fastening device
17a projection
17b projection
17c projection
17d projection
18a locking device (locking element)
18b locking device (locking element)
18 support foot
19 manual operating device
20 button
21 slider or puller
22 arrow
23 arrow
24 oblique element
25 pin
26 locking hook
27 bar
28 lever arm
29 recess
30 hole
31 ring
32 screen
33 pin

The invention claimed is:

1. A child seat system, comprising at least one first seat element, at least one second seat element and one base, which can be attached to a vehicle seat,
wherein the base has a plinth element and a rotary element,
wherein at least the rotary element has at least one fastening device for fastening the at least one first seat element,
wherein the rotary element is rotatably arranged on the plinth element in such a manner that the rotary element together with the at least one first seat element is rotatable with respect to the plinth element in order to change an orientation of the at least one first seat element,
wherein the at least one first seat element is removable from the base,
wherein the at least one first and/or the at least one second seat element is/are adjustable with respect to the base or the plinth element of the base, in particular is/are rotatable from a first orientation into a second orientation, which deviates from the first orientation,
wherein a manual operating device for at least one locking device for releasing and/or locking an adjustment, in particular the rotation is accessible, if the at least one second seat element is mounted on the base, but is not accessible, if the at least one first seat element is mounted on the base, and/or
wherein the at least one locking device for releasing and/or locking the adjustment, in particular rotation is provided, which is operated by the at least one first seat element, in particular by changing an inclination of the at least one first seat element, but not by the at least one second seat element, in particular not by changing an inclination of the at least one second seat element, which potentially cannot be modified regarding its inclination.

2. The child seat system, according to claim 1,
wherein at least the at least one first seat element is rotatable with respect to the base or the plinth element of the base from a first orientation into a second orientation, which deviates from the first orientation,
wherein a corresponding rotation of the at least one second seat element with respect to the base is prevented or at least restricted compared to the rotation of the at least one first seat element.

3. The child seat system, according to claim 1,
wherein the base has a support and/or stabilizing element, in particular a support and/or stabilizing fin, for supporting and/or stabilizing the at least one first seat element or the at least one second seat element, if the latter is on the base.

4. The child seat system according to claim 1,
wherein the at least one first seat element differs from the at least one second seat element in a size.

5. The child seat system according to claim 1,
wherein
the base, in particular the plinth element, comprises at least one anchoring device, comprising in particular at least one anchoring arm and/or an Isofix anchoring device and/or a latch system anchoring device, for releasably fastening the base on a vehicle seat, and/or a support foot and/or at least one anti-rebound device, preferably anti-rebound fin and/or anti-rebound strap and/or the base, in particular the plinth element and/or the rotary element, comprises at least one belt guiding device and/or one indicator device for indicating a specific configuration, in particular orientation of the seat element with respect to the base and/or of the rotary element with respect to the plinth element.

6. The child seat system according to claim 1,
wherein
the base, in particular the rotary element, has at least one fastening device for fastening a seat element or at least two fastening devices,
wherein optionally a first fastening device is designed for fastening the at least one first seat element and a second fastening device for fastening the at least one second seat element.

7. The child seat system according to claim 1,
wherein
the at least one first and/or the at least one second seat element can be locked in at least or exactly two different orientations, in particular in such a manner that the lock is releasable only by means of operating a locking device and/or in that the at least one first and/or the at least one second seat element can be set in at least or exactly two different orientations, in particular in such a manner that the setting can exclusively or only be cancelled by means of a rotation of the at least one first or the at least one second seat element.

8. The child seat system according to claim 1,
wherein
at least one first and/or at least one second locking device for releasing and/or producing a lock of an orientation of the seat element and/or of the rotary element is/are provided,
wherein the at least one first and/or the at least one second locking device is/are preferably arranged on an upper side of the base, in particular in a region, which is covered by the at least one first and/or the at least one second seat element in a mounted state and/or can be operated manually, preferably by means of a manual operating device, in particular by means of a manual sliding device, towing device, pressure device and/or rotary actuator, and/or can be operated by means of adjusting an inclination of the at least one first and/or the at least one second seat element, in particular only by adjusting an inclination of the at least one first seat element, and/or is/are rotatable and/or translationally movable in order to release and/or produce a lock, and/or is/are prestressed by means of a spring device in the direction of a locked state,
wherein the release of the lock can preferably be carried out both by means of operating the at least one first and the at least one second locking device,
wherein the locking devices and/or the operating devices are coupled correspondingly, and/or
wherein the at least one first and the at least one second locking device are arranged or designed to be mirror-symmetrical with respect of one another.

9. The child seat system according to claim 1,
wherein
at least one locking device and/or at least one first operating device, in particular a manual operating device, for releasing and/or producing a lock of the orientation of the seat element and/or of the rotary element, is arranged in a first lateral region of the base, in particular of the plinth and/or rotary element, and optionally a corresponding second operating device is arranged in a second lateral region, located opposite the first region, of the base, in particular of the plinth and/or rotary element.

10. The child seat system according to claim 1,
wherein
a fifth and/or sixth locking device is provided and/or in that a headrest of the at least one first or the at least one second seat element is adjustable in a first orientation in different configurations, in particular relating to a height of the headrest,
wherein preferably the fifth locking device is provided and designed to prevent, in a part of the configurations possible in the first orientation, the seat element from being rotatable from the first into a second orientation and/or
wherein preferably the sixth locking device is provided and designed to prevent a part of the configurations possible in the first orientation being adjustable in the second orientation.

11. The child seat system according to claim 1,
wherein
the first orientation corresponds to a configuration of the seat element, in which the seat element is facing backwards and/or the second orientation corresponds to a configuration of the child seat, in which the seat element is facing forwards and/or in that the seat element is rotatable into a third orientation,
wherein the third orientation preferably lies between the first and the second orientation, in particular is rotated with respect to the first and/or second orientation by 90°.

* * * * *